United States Patent [19]

Venable

[11] Patent Number: 5,620,554

[45] Date of Patent: Apr. 15, 1997

[54] APPARATUS FOR MAKING A COMPOSITE ROOFING PRODUCT

[75] Inventor: Jesse S. Venable, Herington, Kans.

[73] Assignee: Carlisle Corporation, Syracuse, N.Y.

[21] Appl. No.: 378,587

[22] Filed: Jan. 26, 1995

Related U.S. Application Data

[62] Division of Ser. No. 243,703, May 17, 1994, Pat. No. 5,456,785.

[51] Int. Cl.$^6$ ..................................................... B32B 31/04
[52] U.S. Cl. ........................ 156/496; 156/498; 156/499; 156/502; 156/555; 156/583.1; 15/77; 15/179
[58] Field of Search .............................. 156/71, 157, 229, 156/279, 281, 289, 324, 494, 495, 496, 498, 499, 502, 554, 555, 556, 580, 581, 582, 583.1, 574; 15/77, 179, 181

[56] References Cited

U.S. PATENT DOCUMENTS

| | | | |
|---|---|---|---|
| H982 | 11/1991 | Berggren et al. | 264/171 |
| 2,644,779 | 7/1953 | Manning | 156/496 X |
| 2,952,100 | 9/1960 | Pelly | 51/14 |
| 2,995,767 | 8/1961 | Cutler | 15/303 |
| 3,252,257 | 5/1966 | Price et al. | 156/71 X |
| 3,938,213 | 2/1976 | DiFede | 15/77 |
| 3,967,032 | 6/1976 | Plotz et al. | 156/71 X |
| 4,039,706 | 8/1977 | Tajima et al. | 428/40 X |
| 4,044,243 | 8/1977 | Terpay | 428/62 X |
| 4,055,453 | 10/1977 | Tajima et al. | 156/279 X |
| 4,073,997 | 2/1978 | Richards et al. | 428/285 X |
| 4,082,592 | 4/1978 | Raabe et al. | 156/502 X |
| 4,248,926 | 2/1981 | Tajima et al. | 428/253 X |
| 4,268,345 | 5/1981 | Semchuck | 156/499 |
| 4,467,007 | 8/1984 | Elgie | 428/142 |
| 4,492,609 | 1/1985 | Blom | 156/507 |
| 4,704,171 | 11/1987 | Thompson et al. | 156/64 |
| 4,855,172 | 8/1989 | Chiu | 156/71 X |
| 4,920,720 | 5/1990 | Labianca | 156/71 X |
| 4,944,828 | 7/1990 | Dybsky et al. | 156/71 X |
| 4,996,812 | 3/1991 | Venable | 52/408 |
| 5,019,203 | 5/1991 | Singer | 156/309.9 |
| 5,206,068 | 4/1993 | Kalkanoglu | 428/143 X |
| 5,256,228 | 10/1993 | Davis et al. | 156/71 X |
| 5,286,555 | 2/1994 | Reed | 428/283 |

FOREIGN PATENT DOCUMENTS

| | | | |
|---|---|---|---|
| 2267220 | 8/1992 | France | 156/71 |
| 0450143 | 8/1990 | Germany . | |
| 4000560 | 7/1991 | Germany | 156/71 |
| 0022334 | 7/1975 | Japan | 156/71 |
| 9301852 | 3/1994 | United Kingdom . | |

Primary Examiner—James Sells
Attorney, Agent, or Firm—Wood, Herrron & Evans, L.L.P.

[57] ABSTRACT

An apparatus for making a composite roofing material includes a reel support for reels of each of a vulcanized rubber sheet, a polymeric film and a fleece matting and pinch rollers which advance the rubber sheet from its reel through a path including an abrading roller, a cleaning and scrubbing vat, a stretcher, a heater and then, along with the polymer film and the matting, through a pair of compression pinch rollers. The cleaning and scrubbing vat effectively removes the non-stick talc coating from the vulcanized rubber. The thus cleaned rubber sheet is heated by the heater to a temperature which is sufficient to melt the polymeric film as it comes into contact with the vulcanized rubber sheet. The melted film acts as an adhesive to cause the fleece matting to adhere to the vulcanized rubber sheet as the rubber sheet, the polymeric film and the fleece matting are compressed together by the compression pinch rollers. When the rolls of polymeric film and fleece matting are somewhat narrower than the vulcanized rubber sheet, a selvedge is left along one or both sides of the roofing.

22 Claims, 3 Drawing Sheets

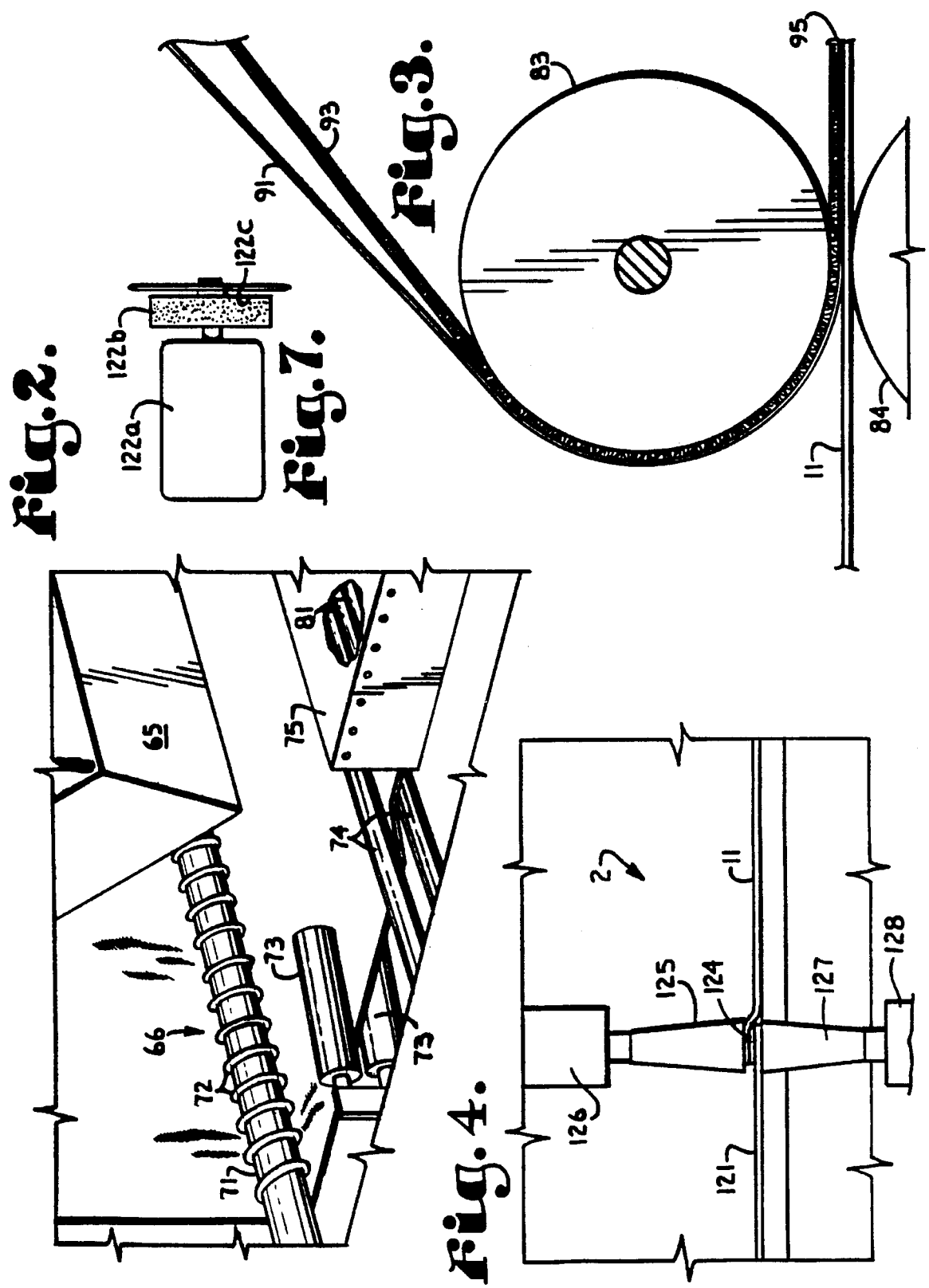

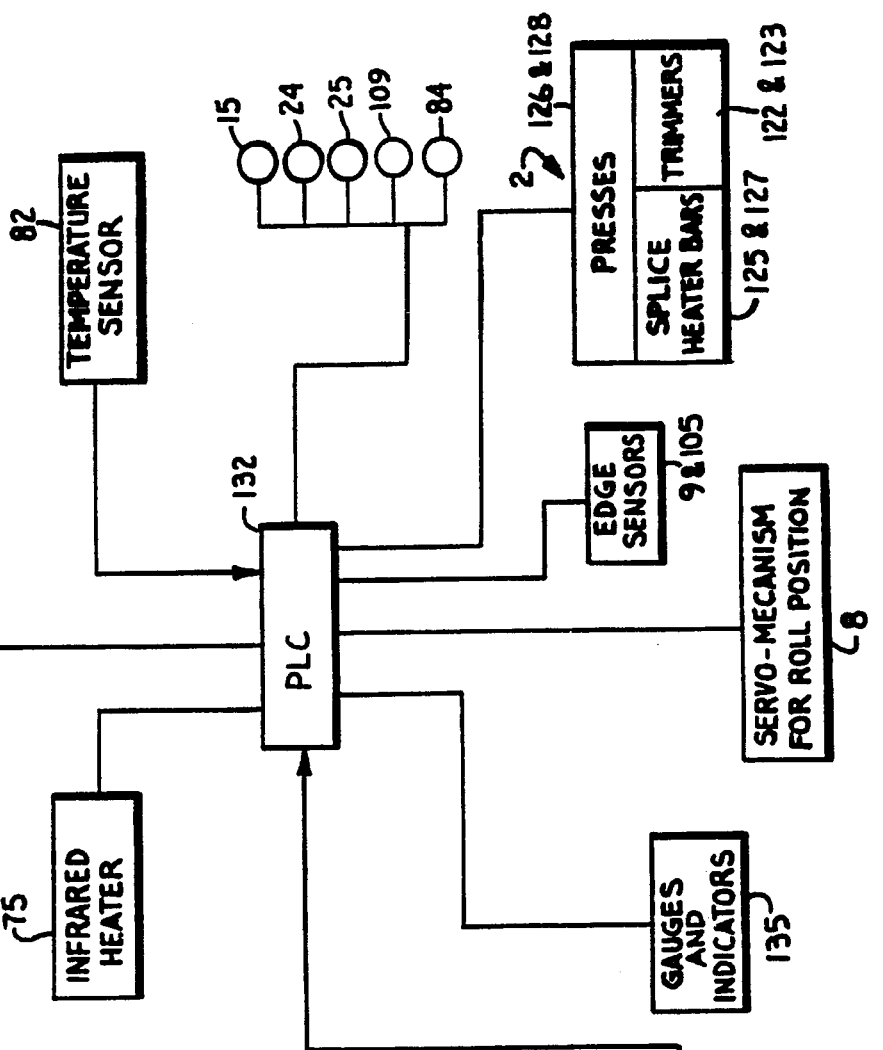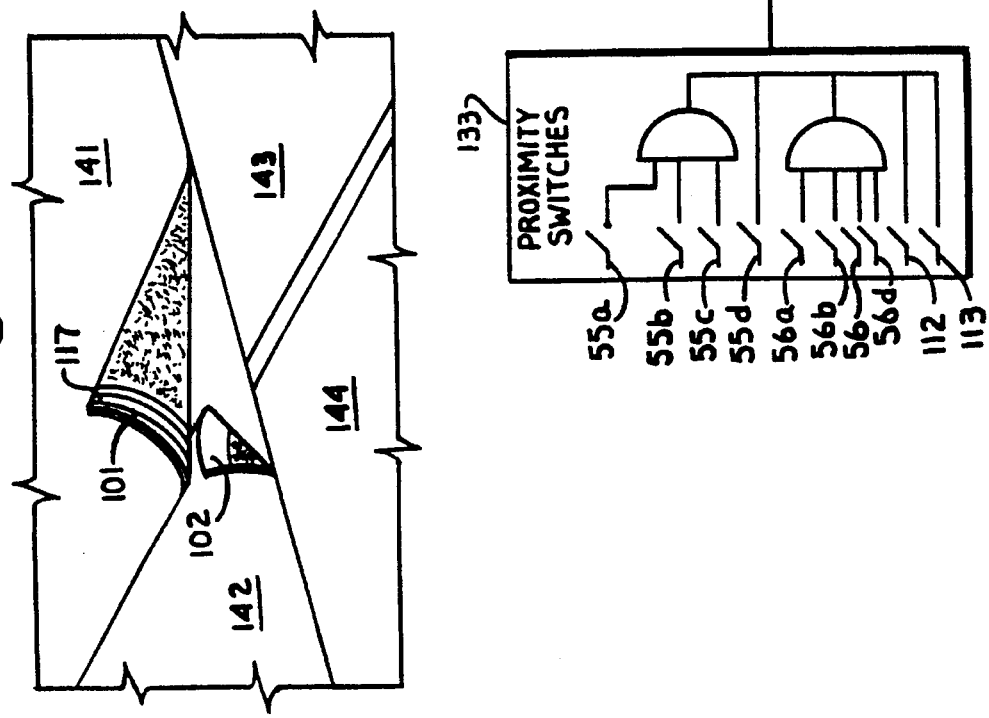

APPARATUS FOR MAKING A COMPOSITE ROOFING PRODUCT

CROSS REFERENCE TO RELATED APPLICATIONS

This application is a divisional of U.S. application for patent Ser. No. 08/243,703 filed May 17, 1994, U.S. Pat. No. 5,456,785, for COMPOSITE ROOFING PRODUCT AND METHOD AND APPARATUS FOR MAKING A COMPOSITE ROOFING PRODUCT.

BACKGROUND OF THE INVENTION

1. Field of the Invention

The present invention relates generally to an apparatus for making a composite roofing product which product includes a synthetic vulcanized rubber sheet with a fabric matting adhered thereto via a polymeric film. The apparatus includes a cleaning vat for scrubbing and cleaning talc or other non-stick coatings from a vulcanized rubber sheet and a heater for heating the cleaned rubber sheet. After passing through the heater, a polymeric film is sandwiched between the rubber sheet and a fleece matting with the heat from the rubber sheet melting the polymeric film. The rubber sheet, the polymeric film and the fleece matting are then compressed together by compression rollers, causing the melted polymeric film to bond the fleece matting to the rubber sheet.

2. Description of the Related Art

Continuous sheet roofing products have been increasingly used in commercial building applications which involve large roof expanses, particularly with flat or shallow pitched roofs. This popularity of sheet roofing is due to a variety of factors, including convenience and speed of installation, reduced material and labor costs and longevity and reliability of the installed roof. Many sheet roofing products include synthetic rubber which are applied from rolls and attached to the roof via a variety of adhesives and fasteners.

While synthetic rubber sheets offer a number of advantages over competing products, including good weather resistance and elasticity, such rubber sheets, in and of themselves are not very resistant to puncture or stress cracking. Furthermore, rubber sheets, with their relatively smooth and moisture impervious surfaces, are resistant to bonding by most conventional adhesives, presenting a problem in reliably adhering the rubber sheets to the roof surface. Finally, where contiguous rolls of rubber sheets meet, they must overlap each other to form a weather impervious seal but these joints create a potential problem area where the overlapped rubber seams are adhered.

Previous attempts have been made to produce a composite roofing material including a synthetic rubber sheet with a fabric backing adhered thereto. One such roofing material is a membrane including a synthetic rubber sheet having a thickness of from 40–70 mils backed by a polyester fleece-like matting having a thickness of about 40–80 mils which is produced by the Colonial Rubber Company of Dyersburg, Tenn. This product has proven to be very durable and crack and puncture resistant. In addition, the fleece-like matting provides an ideal bonding surface for roofing adhesives, such as the polyurethane foam adhesive taught in U.S. Pat. No. 4,996,812 (the '812 patent) to the present inventor, as well as asphalt and other adhesives.

Mass production of this composite material has proven to be problematical, however. In the known production method, the fleece-like matting is adhered to the rubber sheet during the vulcanization process, thus substantially complicating the vulcanization process and requiring very expensive, dedicated production machinery. At least partially as a result of the complexity of the process and equipment, material waste averages in excess of 30%. Since the membrane product is produced during the vulcanization process, the wasted material has virtually no other use. In addition, conventional vulcanization steam curing techniques cannot be used with the fleece lined material, thus requiring vulcanization time periods which are substantially increased over conventional vulcanized materials. Furthermore, it has proven impossible to produce a membrane with a selvedge on the underside of the membrane between the outside edge of the rubber sheet and the polyester matting. This is because, if such a selvedge is left, once the membrane is rolled into a roll for vulcanizing, the exposed selvedges will stick to adjacent layers in the roll, thus resulting in a congealed mass.

It is clear then, that a need exists for an economical and reliable apparatus for producing a composite roofing material including a flexible sheet backed by a fleece-like matting. Such an apparatus should preferably use existing rolls of synthetic vulcanized rubber (such as EPDM), which are available in commodity quantities, and should produce a roofing material with minimal waste. The roofing material thus produced should preferably include a selvedge on each side of the material underside between the edge of the rubber sheet and the matting for facilitating the attachment of sealing tape or adhesive between adjacent sheets as they are applied to a roof surface. The apparatus for producing the composite roofing material must be capable of cleaning non-stick talc coatings from the vulcanized rubber to form a reliable bonding surface, should be relatively economical to make and to run, and should be capable of producing large quantities of finished roofing material with minimal waste.

SUMMARY OF THE INVENTION

In the practice of the present invention, a composite roofing material is produced by abrading one side of a synthetic rubber sheet, washing and scrubbing the abraded sheet, and heating the sheet. The thus cleaned, heated sheet is advanced between a pair of compression pinch rollers simultaneously with a thin polymeric film, such as polyethylene, and a polyester fleece-like matting. The heated rubber causes the polymeric film to melt and adhere the matting to the rubber sheet. The rubber sheet with the matting adhered is then cooled and rolled onto a reel. The matting and polymeric film are preferably both somewhat narrower than the rubber sheet, thus leaving an exposed selvedge of rubber on both longitudinal edges of the underside of the roofing material. A strip of double sided tape and/or primer is optionally applied to one or both of these selvedges as the composite material is cooling to provide a convenient way for adjacent sheets of roofing to be attached to each other.

An apparatus for producing such a composite roofing material includes supports for a reel of sheet rubber and separate reels of polymeric film and polyester matting. The rubber sheet is advanced from its reel past an abrading roller which abrades one side of the sheet. The abraded sheet is then passed through a rinsing vat filled with water and/or other cleaning fluids and between a pair of counter-rotating cylinders covered with stiff-bristled nylon brushes. The brushes and cleaning fluid in the vat thoroughly clean both sides of the rubber sheet, effectively removing any talc or other non-stick coatings from the vulcanized sheet, thus allowing effective bonding of the cleaned sheet. The rubber sheet is then advanced through an accumulator and, upon leaving the accumulator, through a preheat and stretching apparatus. Next the stretched rubber sheet is passed through an infrared heater where its surface temperature is raised to a range of 250 to 350 degrees Fahrenheit. The heated sheet is then pulled through a pair of compression pinch rollers simultaneously with the polymeric film and the polyester fleece matting. The polymeric film is substantially melted, thus causing the matting to adhere to one side of the cleaned, heated rubber sheet to form a composite material. The composite material is then cooled and rolled into rolls of finished product. After the material passes through the compression pinch rollers, a tape applying roller and compressor optionally applies a strip of splicing tape and/or primer to one or both selvedges of the material.

A splicing table is positioned ahead of the apparatus to splice together rolls of vulcanized rubber end to end. The splicing table includes a pair of combination cutting and abrading wheels which both cut and abrade the ends of both rolls in preparation for splicing. A layer of double-sided splicing tape is then positioned between the abraded ends and a pair of heating bars are applied to the splice joint. In this fashion, spliced rolls of vulcanized rubber can be continuously spliced "on the fly" and fed through the apparatus without the need to rethread each roll of vulcanized rubber through the apparatus.

OBJECTS AND ADVANTAGES OF THE PRESENT INVENTION

The objects and advantages of the present invention include: providing an apparatus for making a composite roofing material; providing such an apparatus in which a sheet of vulcanized rubber is cleaned, stretched, and heated; providing such an apparatus in which the heated vulcanized sheet is compressed with a polymeric film and a polyester matting to form the composite roofing material; providing such an apparatus with a cleaning vat within which a pair of counter-rotating brush cylinders clean any talc or other non-stick materials from the surface of the vulcanized rubber to yield an effective bonding surface; providing such an apparatus in which a splicing table is provided with which rolls of vulcanized rubber can be spliced end to end on the fly; providing an improved composite roofing material produced by the apparatus; providing such a material which includes a flexible synthetic rubber outer layer and a fleece-like inner layer; providing such a material in which the rubber layer and the fleece layer are adhered together via a thin polymeric film or hot melt adhesive; to provide such a material in which a selvedge of exposed rubber is left on each longitudinal edge of the underside of the material; providing such a material in which a strip of double sided splicing tape is optionally attached to one or both selvedges of the material; providing a method of making a composite roofing material which minimizes waste and reliably produces a uniform product; providing a method of making the material in which a rubber sheet is abraded, cleaned, stretched and heated and then compressed with a polymeric film or hot melt adhesive and a polyester matting; providing such a method of making the material in which the compressed rubber sheet, polymeric film and polyester matting is cooled and rolled into rolls of final product; providing such a method in which sheets of rubber can be spliced end to end "on the fly"; providing such a method in which a selvedge of exposed rubber is created along both underside longitudinal edges of the composite material; providing such a method in which a strip of splicing tape and or primer is optionally applied to one or both of the selvedges; and providing such a roofing material, a method of making roofing material and an apparatus for making roofing material which is economical, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is a greatly enlarged, fragmentary perspective view of a portion of the apparatus of FIG. 1, illustrating a stretching roller and an attached coiled rod embedded with carborundum and an infrared heater with portions broken away to show heating rods.

FIG. 3 is a greatly enlarged and fragmentary side elevational view of the apparatus of FIG. 1, illustrating a pair of compression pinch rollers and three separate material webs being compressed into a single composite roofing material.

FIG. 4 is an enlarged, fragmentary side elevational view of a portion of a splicing table of FIG. 1, illustrating a splicing operation between a pair of synthetic rubber sheets with two pressure heating bars.

FIG. 5 is a fragmentary perspective view of a number of sheets of composite roofing material according to the present invention with the sheets being installed on a roof; and with edges of two adjoining sheets rolled over to illustrate respective selvedges and the placement of double sided splicing tape.

FIG. 6 is a block diagram of a control circuit for controlling the apparatus of FIG. 1.

FIG. 7 is a greatly enlarged side elevational view of one of the cutting and abrading wheels of the splicing table of FIG. 1.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functions details disclosed herein are not to be interpreted as limiting, but merely as a basis for the claims and as a representative basis for teaching one skilled in the art to variously employ the present invention in virtually any appropriately detailed structure.

II. Apparatus

Figure 1A:
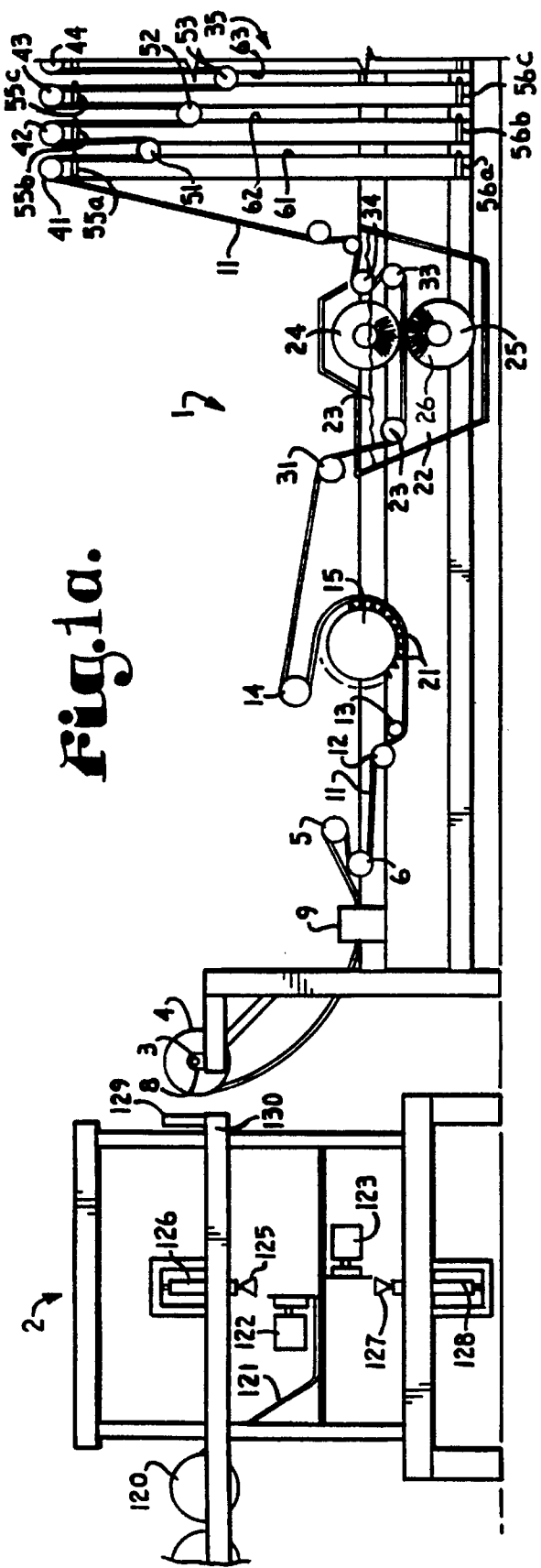
FIGS. 1A and 1B collectively are a schematic view of an apparatus for making a composite roofing material in accordance with the present invention.
Figure 1B:
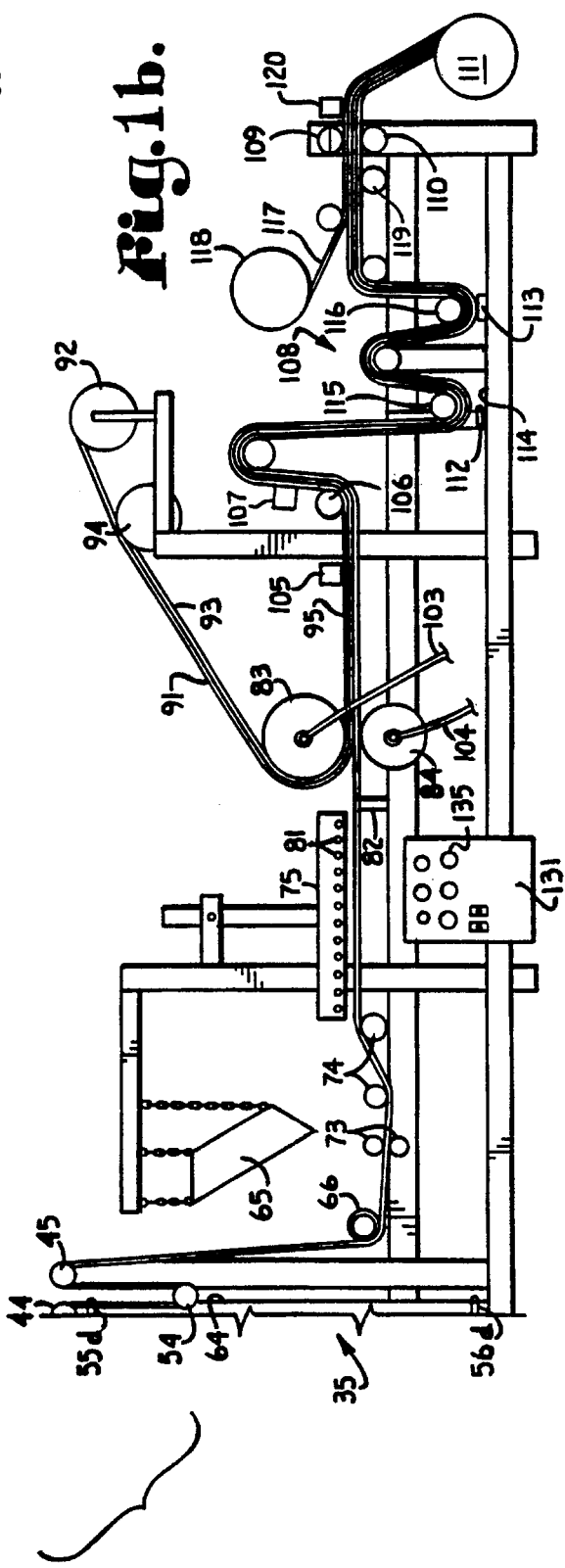

Referring to the drawings in more detail, and particularly to FIGS. 1A and 1B, reference numeral 1 designates an apparatus for making composite roofing material in accordance with the present invention. A splicing table 2 is also shown for splicing sheets of synthetic rubber material together end to end, as will be explained more fully below.

The apparatus 1 includes a first reel support 3 for supporting a reel 4 of vulcanized rubber sheeting. A pair of drive rollers 5 and 6 pull a vulcanized rubber sheet 11 from the reel 4. The lateral position of the reel 4 is adjusted by a servo-mechanism 8, which is controlled by an edge position sensor 9. The sensor 9, for example, can include a pair of LED's and corresponding light sensitive sensors placed, respectively, above and below and astride the desired edge position of the vulcanized rubber sheet 11. When one sensor is blocked and one sensor is receiving light, the reel 4 is correctly positioned, but when both or neither sensor is receiving light, the servo-mechanism 8 must be adjusted one way or the other until correctly positioned. The sheet 11 is then fed into a first pair of tensioning rollers 12 and 13. The tensioning rollers 12 and 13, in cooperation with a tensioning roller 14, constrain the vulcanized rubber sheet 11 and pull it against a motor driven abrading roller 15. The roller 15 is shown equipped with abrading teeth 21, but an otherwise smooth roller coated with industrial diamond dust, carborundum grit or the like is suitable as well. The abrading roller 15 loosens the ordinary non-stick talc coating typically applied to synthetic rubber sheets after the vulcanization process. From the tensioning roller 14, the vulcanized rubber sheet 11 is passed through a rinsing vat 22 containing water 23 or other cleaning fluid. Within the vat 22 a pair of counter-rotating cylindrical brushes 24 and 25 thoroughly clean the talc from both sides of the sheet 11 while removing any particles remaining from the abrading action of the roller 15. Again, tensioning rollers 31–34 pull the sheet taught against the brush cylinders 24 and 25. Each of the brush cylinders 24 and 25 includes a large plurality of stiff nylon bristles 26 adhered thereto. Although a single pair of brush cylinders 24 and 25 are illustrated, for more thorough cleaning, two or more pairs of such cylindrical brushes may be utilized in series.

From the vat 22, the vulcanized rubber sheet 11 is pulled upward into a dryer and accumulator, generally indicated at 35. The accumulator 35, which overlaps between FIG. 1A and FIG. 1B, includes a number of fixed rollers 41–45, here shown as 5 in number, and a plurality of movable rollers 51–54, here shown as 4 in number. As is conventional in such accumulators, the movable rollers 51–54 are weighted and are free to move up and down within respective slots 61–64 to hold a variable length of vulcanized rubber sheet 11. A plurality of position sensors 55a–55c are provided at the top of each slot 61–64 and a plurality of proximity switches 56a–56d to sense the positions of movable rollers 51–54 at the uppermost and lowermost positions, respectively, within their respective slots 61–64 to thereby control cycles of the abrading roller 15 and the brush cylinders 24 and 25 as well as pinch rollers 5 and 6, as will be explained below. The accumulator 35 thus acts as a buffer to store a length of the vulcanized rubber sheet 11 sufficient to compensate for speed differences before and after the accumulator 35.

From the accumulator 35, the vulcanized rubber sheet 11 is drawn downward past a preheater 65, which preheats the sheet 11, and past a stretching roller 66. The stretching roller 66 is better illustrated in FIG. 2. Referring to FIG. 2, the stretching roller 66 includes a relatively small diameter cylinder 71 about which is tightly wrapped and welded a coiled rod 72. The cylinder 71 is rotated counter-clockwise (as shown in FIG. 2) at a speed such that the outer surface of the coiled rod 72 spins faster than the rate at which the vulcanized rubber sheet 11 is advancing. This causes the sheet 11 to be stretched in width as it passes the roller 66. Still referring to FIG. 2, two opposed pairs of edge steering rollers 73, of which only one is illustrated, act to smooth the edges of and steer the sheet 11 as it exits the stretching roller 66.

From the edge rollers 73, the sheet 11 passes through a guide rollers 74 and beneath an infrared heater 75. Again referring to FIG. 2, the heater 75 can include a plurality of resistive rods 81 which are heated by the application of an electrical current. While only one heater 75 is shown, it should be noted that multiple ones of these heaters can be positioned both above and below the sheet 11 to increase the heating efficiency of the apparatus 1. For the best results it has been determined that the vulcanized rubber sheet 11 must be heated to a surface temperature range of 275–350 degrees Fahrenheit, depending upon what adhesive media is used.

Referring to FIGS. 1B and 3, the vulcanized rubber sheet 11, upon leaving the heater 75, is drawn past a temperature sensor 82, and then through a pair of compression pinch rollers 83 and 84, of which one or both rollers 83 and 84 may be driven. The temperature sensor 82 is used to control the speed of the compression pinch roller 84, as will be explained below. At this point, the abraded side of the vulcanized rubber sheet 11 is compressed by the rollers 83 and 84 along with a continuous length of thin polymer film 91 extending from a reel 92 and a continuous sheet of fleece-like polyester matting 93 extending from a reel 94 to yield a sheet of composite roofing material 95. Preferably both the polymer film 91 and the matting 93 are somewhat narrower than the vulcanized rubber sheet 11, thus leaving an exposed selvedge 101 and 102, respectively (FIG. 5), on the underside of either longitudinal edge of the composite sheet 95. In order to begin cooling the composite roofing sheet 95, as well as to control the temperature of the pinch rollers 83 and 84, heating and cooling water is circulated through the pinch rollers 83 and 84 via respective supply pipes 103 and 104 and opposite drain pipes (not shown). Although the preferred embodiment is illustrated as using the thin polymer film 91 to perform essentially as a hot melt adhesive, it should be emphasized that, instead of a film 91, an extruded hot melt adhesive (not shown) can be applied to the cleaned, heated rubber sheet 11 which can then be compressed with the matting 93 to form the roofing material 95.

From the compression pinch rollers 83 and 84, the composite roofing sheet 95 is pulled beneath a pair of edge sensors 105, only one of which is shown. The edge sensors 105 detect the edges of the sheet 95 to provide accurate steering data. The sheet 95 is then pulled past a tension roller 106 and a primer applicator 107 which optionally applies a layer of primer to one or both the selvedges 101 and 102. The composite sheet 95 is then passed through a second, smaller accumulator 108 and then past a pair of variable speed exit pinch rollers 109 and 110 where it is loaded onto a motor driven reel 111. Within the accumulator 108, a pair of position sensing proximity switches 112 and 113 are positioned within a pair of slots 114 to sense the position of a respective pair of movable rollers 115 and 116. These switches 112 and 113 control the exit pinch rollers 109 and 110, as explained below. At this point a double-sided splicing tape 117 is optionally applied from a tape reel 118 to the selvedge 101 (FIG. 5). The sheet 95 at this point still retains considerable heat, which facilitates the adherence of the tape 117 to the sheet 95. The tape 117 preferably has a peelable non-stick covering over the exposed upper side. A primer applied by the applicator 107 can facilitate the adherence of the tape 117 to the sheet 95. A length measurement sensor 119 is located just ahead of the pinch rollers 109 and 110 to measure the length of the roofing sheet 95 and to control a cutter 120 to create rolls of a particular length.

The composite sheet 95 is shown in a closer approximation to scale in FIG. 3. Typical thicknesses for the vulcanized rubber sheet 11 range from 30 to 80 mils, for the polymer film 91 (or other hot melt adhesive) from 1 to 5 mils, and for the polyester matting 93 from 30 to 80 mils. A successful production run has been made with a EPDM rubber sheet 11 of between 45 and 60 mils, a polyethylene film 91 of 1.5 mils and a polyester matting 93 of 55 mils.

Splicing Table

Referring to FIGS. 1A, 4 and 7, a portion of the splicing table 2 is shown in greater detail, with a reel 120 from which a second synthetic vulcanized rubber sheet 121 is drawn, being spliced end to end with the first sheet 11. The sheet 121 is trimmed and abraded by a top edge trimmer and abrading wheel 122 while the sheet 11 is trimmed and abraded by a bottom edge trimmer and abrading wheel 123. The trimmer and abrading wheels 122 and 123 are identical and thus only the upper trimmer 122 is illustrated in detail in FIG. 7. The trimmer 122 includes a motor 122a which drives both an abrading wheel 122b and a cutter wheel 122c. The trimmer 122 can be selectively lowered into place and moved along the end of the sheet 121 to both uniformly trim the sheet end via the cutting wheel 122c and abrade the surface of the sheet 121 to remove any talc therefrom and prepare the surface for adhesion of a length of heat sensitive double-sided splicing tape 124. The tape strip 124 is inserted between the overlapping edges of the sheets 121 and 11. A top heating and compression bar 125 is lowered into contact with the overlapped edges by a press 126, with the top bar 125 urging the overlapped edges into contact with a bottom heating and compression bar 127 and press 128. The bars 125 and 127 heat the splice to a temperature at which the tape 124 will successfully adhere to both sheets 121 and 11 while simultaneously applying pressure to yield an even splice. Referring to FIG. 1A, with the splicing table 2 positioned in front of the apparatus 1, the reel 4 can be spliced together with the reel 120 "on the fly", i.e. as the apparatus 1 continues to make composite roofing material, to avoid shutting down production as the reel 4 is used up. A hinged extension 129 of a reel track 130 can be lowered to allow the reel 120 to be easily moved over the splice table 2 and onto the reel support 3 of the apparatus 1.

IV. Control Circuit

Referring to FIGS. 1B and 6, a control panel 131 includes a Programmable Logic Controller or PLC 132. The PLC 132 is connected to various sensors, including the temperature sensor 82, the accumulator position sensors 55a–d, 56 a–d, 112 and 113, and the edge sensor 9. In response to the temperature sensor 82, the PLC 132 controls the speed of compression pinch roller 84 to thereby control the duration of time that a given segment of the sheet 11 remains in proximity to the heater 75. The PLC 132 is responsive to the edge sensor 9 to control the position of servo-mechanism 8 to thereby control the lateral position of reel 4. The PLC 132 is also responsive to the accumulator position sensors 55a–d and 56a–d, as well as the accumulator position sensors 116 and 117, which can be proximity switches logically combined by the PLC 132, as shown in block 133.

Referring to block 133, the top switches 55b–55d are logically ANDed together by the PLC 132 to provide a combined feed output signal when all three are ON which causes the PLC 132 to start the abrading roller 15 and brush cylinders 24 and 25 and associated drive rollers to thereby feed more of the vulcanized rubber sheet 11 to the accumulator 35. The switch 55a is separately monitored for an emergency stop signal which shuts off the entire apparatus 1 should the accumulator 35 become totally empty. Similarly, the bottom four switches 56a–56d are ANDed together to provide an accumulator full output signal when all four are ON which causes the PLC 132 to temporarily stop the abrading roller 15 and brush cylinders 24 and 25 and associated drive rollers. The two proximity switches 112 and 113 in the accumulator 108 are monitored by the PLC 132 which is responsive to both switches being ON to start the exit pinch rollers 109 and 110. The PLC 132 continues to drive the pinch rollers 109 and 110 until both switches 112 and 113 are OFF. Finally the PLC 132 is connected to the splice table 2 to control the trimmer and abraders 122 and 123, the splicing heater bars 125 and 127 and the presses 126 and 128, and to a plurality of gauges and indicators 135.

V. Composite Roofing Material

A number of sheets 141–144 of the composite roofing material 95 made by the apparatus of FIGS. 1–4 and 6 is illustrated in FIG. 5 being applied to a roof. Each sheet 141–144 includes 2 selvedges 101 and 102 which extend longitudinally along the underside edges of each sheet. The selvedge 101 includes a strip of the double-edged splicing tape 117 applied thereto, as described above. As shown in FIG. 5, when the sheets 141 and 142 are being applied to a roof, for example via an adhesive as taught in the '812 patent, the selvedge 101 of sheet 141, with the tape strip 117 is overlayed over the selvedge 102 of adjacent sheet 142. Given relative thicknesses of vulcanized rubber sheet 11 and polyester matting 93 similar to those earlier described, e.g. 45 mils to 55 mils, respectively, a seam between adjacent sheets 141 and 142 which incorporates tape of a thickness less than 40 mils would lie approximately flat on the roof surface, thus greatly speeding up the application process and avoiding many of the problems of prior art applications.

While the apparatus 1 has been illustrated with a specific arrangement of reels, drive rollers, abrading roller, accumulator, heater, etc., it should be noted that many alternative arrangements could produce composite roofing materials of the type contemplated. In addition, the PLC controller 132 can control other variables such as heat output in addition to compression roller speed to vary heat application. It is thus to be understood that while certain forms of the present invention have been illustrated and described herein, it is not to be so limited.

What is claimed and desired to be secured by Letters Patent is as follows:

1. Apparatus for making a composite roofing material, comprising:
    (a) a splicer, a support for a first roll of vulcanized sheet downstream of said splicer, a first roll of vulcanized sheet in said support, a supply of fleece, and a supply of thermoplastic adhesive film, said vulcanized sheet extended along a path;
    (b) A heater for heating a first side of said vulcanized sheet;
    (c) said vulcanized sheet and said fleece compressed together, separated by said thermoplastic adhesive at a pair of unheated compression rollers immediately downstream of said heater and said rollers;
    (d) said rollers compressing one side of said heated vulcanized rubber sheet with one side of said thermoplastic adhesive film while simultaneously compressing one side of said fleece with the other side of said thermoplastic adhesive film, wherein said heating is effective to heat the first side of said vulcanized sheet to a temperature above a melting temperature of said thermoplastic film;
    (e) said splicer having a support for a second roll of vulcanized sheet, and a mechanism adapted to splice together a trailing edge of said first roll of vulcanized sheet to a leading edge of said second roll of vulcanized sheet;
    (f) an apparatus adapted to guide said second roll of vulcanized sheet from said splicer to said apparatus to support said first roll of vulcanized sheet, thereby permitting splicing of vulcanized sheet from one roll to another on the fly.

2. Apparatus as in claim 1, and further comprising abrading means for abrading said one side of said vulcanized sheet, said abrading means being positioned ahead of said heating means on said path.

3. Apparatus as in claim 1, and further comprising cleaning means positioned ahead of said heating means on said path for rinsing and scrubbing said vulcanized sheet.

4. Apparatus as in claim 3, wherein said cleaning means comprises:

(a) a container containing cleaning fluid through which said vulcanized sheet is drawn; and (b) counter-rotating cylindrical brushes positioned in said container for brushing said vulcanized sheet.

5. Apparatus as in claim 4, wherein each of said brushes includes a plurality of stiff bristles along the exterior surface thereof.

6. Apparatus as in claim 1, and further comprising cooling means for cooling said composite roofing material.

7. Apparatus as in claim 6, and wherein said cooling means comprises circulating means for circulating cooling fluid through a pair of counter-rotating rollers.

8. Apparatus as in claim 1, and further comprising:

(a) stretching means positioned ahead of said heating means on said path for stretching said vulcanized sheet.

9. Apparatus as in claim 8, wherein said stretching means comprises:

(a) a cylinder with a spirally wound rod attached thereto, said spirally wound rod contacting said vulcanized sheet as it is advanced through said path: and (b) rotating means for rotating said cylinder at a speed at which an outer surface of said rod moves over said vulcanized sheet faster than said vulcanized sheet is advancing through said path.

10. Apparatus as in claim 1, and further comprising reel means for rolling said composite roofing material into a roll.

11. Apparatus as in claim 1, wherein said polymeric film and said fleece-like matting are narrower in width than said vulcanized sheet whereby said compressing means creates at least one selvedge between an edge of said vulcanized sheet and an edge of said fleece-like matting on at least one longitudinal edge of said composite roofing material.

12. Apparatus as in claim 11, and further comprising tape applying means for applying a strip of double sided adhesive tape to at least one said selvedge after said compressing step.

13. Apparatus as in claim 1, wherein said splicing apparatus comprises:

(a) a table upon which a pair of said vulcanized sheets can be laid end to end, with their respective ends overlapping;

(b) trimming and abrading means for simultaneously trimming and abrading the ends of said vulcanized sheets to be spliced;

(c) apparatus for applying a strip of heat sensitive splicing tape between the overlapping trimmed and abraded ends of said sheets; and (d) a splice heater for heating the overlapping ends and the splicing tape to create a durable splice between said vulcanized sheets.

14. Apparatus as in claim 13, wherein said splice heating means in said splicing apparatus comprises:

(a) a pair of elongate heating bars; and (b) press means for selectively bringing said bars into contact with respective ones of said overlapping ends to thereby heat and put pressure on said overlapping ends and said tape strip.

15. Apparatus for making a composite roofing material, comprising:

(a) cleaning means for rinsing and scrubbing a vulcanized rubber sheet, said cleaning means comprising:

(i) a container containing cleaning fluid through which said vulcanized sheet is drawn; and (ii) a pair of counter-rotating brush cylinders positioned in said container for brushing said vulcanized sheet, each of said cylinders including a plurality of stiff bristles attached to the periphery thereof and extending along the length of the cylinder;

(b) heating means for heating the cleaned vulcanized rubber sheet;

(c) Compressing means for compressing one side of the heated vulcanized rubber sheet with one side of a polymeric film while simultaneously compressing one side of a fleece-like matting with the other side of said polymeric film;

(d) propulsion means for advancing said vulcanized sheet through a path which includes passing between said counter-rotating cylinders in said vat, said heating means and then said compressing means; ,and (e) apparatus to tension said vulcanized sheet as it is advanced between said counter-rotating clinders.

16. Apparatus as in claim 15, and further comprising abrading means for abrading said one side of said vulcanized sheet, said abrading means being positioned ahead of said heating means on said path.

17. Apparatus as in claim 15, wherein said compression means comprises a pair of pinch rollers between which said vulcanized sheet, said polymeric film and said fleece-like matting are advanced.

18. Apparatus as in claim 15, and further including stretching means positioned ahead of said heater, said stretching means comprising:

(a) a cylinder with a spirally wound rod attached thereto, said spirally wound rod contacting said vulcanized sheet as it is advanced through said path; and (b) rotating means for rotating said cylinder at a speed at which an outer surface of said rod moves over said vulcanized sheet faster than said vulcanized sheet is advancing through said path.

19. Apparatus as in claim 15, wherein said polymeric film and said fleece-like matting are narrower in width than said vulcanized sheet and wherein said compressing means creates at least one selvedge between an edge of said vulcanized sheet and an edge of said fleece-like matting on at least one longitudinal edge of said composite roofing material.

20. Apparatus for cleaning a vulcanized rubber sheet, comprising:

(a) a container containing cleaning fluid through which said vulcanized sheet is drawn;

(b) a pair of brush cylinders positioned in said container for brushing said vulcanized sheet, each of said cylinders including a plurality of stiff bristles attached to the periphery thereof and extending along the length of the cylinder;

(c) drive means for driving said pair of brush cylinders in counter-rotating directions;

(d) propulsion means for propelling said vulcanized rubber sheet through said container and between said brush cylinders; and (e) apparatus to tension said vulcanized sheet as it is propelled through said container and between said brush cylinders.

21. The apparatus claimed in claim 20 wherein said cleaning fluid is water.

22. Apparatus claimed in claim 20, further comprising an abrasive roller upstream of said container adapted to abrade the surface of said vulcanized rubber sheeting to loosen particulate material from said surface.

* * * * *